US008655877B2

(12) United States Patent
Lariba-Pey et al.

(10) Patent No.: US 8,655,877 B2
(45) Date of Patent: *Feb. 18, 2014

(54) SYSTEM AND PROGRAM FOR JOINING SOURCE TABLE ROWS WITH TARGET TABLE ROWS

(75) Inventors: Josep L. Lariba-Pey, Barcelona (ES);
Victor Muntes-Mulero, Barcelona (ES);
Herbert W. Pereyra, Toronto (CA);
Josep Aguilar-Saborit, Barcelona (ES);
Calisto P. Zuzarte, Pickering (CA)

(73) Assignee: International Business Machines Corporation, Armonk, NY (US)

( * ) Notice: Subject to any disclaimer, the term of this patent is extended or adjusted under 35 U.S.C. 154(b) by 1397 days.

This patent is subject to a terminal disclaimer.

(21) Appl. No.: 12/212,100

(22) Filed: Sep. 17, 2008

(65) Prior Publication Data
US 2009/0012990 A1    Jan. 8, 2009

Related U.S. Application Data

(63) Continuation of application No. 11/095,619, filed on Apr. 1, 2005, now Pat. No. 7,512,625.

(51) Int. Cl.
*G06F 17/30* (2006.01)

(52) U.S. Cl.
USPC ............................................. 707/736

(58) Field of Classification Search
USPC ............... 707/999.101, 999.001, 687, 714, 707/999.102, 736
See application file for complete search history.

(56) References Cited

U.S. PATENT DOCUMENTS

| | | | |
|---|---|---|---|
| 5,495,608 A | 2/1996 | Antoshenkov | |
| 5,758,337 A * | 5/1998 | Hammond | 1/1 |
| 5,787,411 A * | 7/1998 | Groff et al. | 1/1 |
| 5,845,113 A | 12/1998 | Swami et al. | |
| 5,960,428 A | 9/1999 | Lindsay et al. | |
| 5,960,429 A | 9/1999 | Peercy et al. | |
| 6,067,542 A | 5/2000 | Carino, Jr. | |
| 6,134,546 A | 10/2000 | Bestgen et al. | |
| 6,144,957 A | 11/2000 | Cohen et al. | |
| 6,185,557 B1 * | 2/2001 | Liu | 1/1 |
| 6,473,763 B1 | 10/2002 | Corl, Jr. et al. | |
| 6,484,168 B1 * | 11/2002 | Pennock et al. | 1/1 |
| 6,618,729 B1 | 9/2003 | Bhashyam et al. | |

(Continued)

*Primary Examiner* — Eliyah S. Harper
(74) *Attorney, Agent, or Firm* — Sughrue Mion, PLLC

(57) ABSTRACT

Disclosed is a data processing system, and an article of manufacturing for use with the data processing system. The data processing system joins rows associated with a column of a source table with rows associated with a column of a target table. The data processing system includes a source node containing the source table and including a target node containing the target table. The data processing system further includes a generating module for generating a reduced representation of selected rows associated with the column of the source table, and generating a representation of the column of the target table, a filtering module for filtering the generated reduced representation of selected rows associated with the column of the source table through the generated representation of the column of the target table, the filtered generated reduced representation of selected rows identifying source table rows that do not have to be joined with the target table, and a joining module for joining, to the rows associated with the column of the target table, the rows associated with the column of the source table minus the filtered generated reduced representation of selected rows.

24 Claims, 6 Drawing Sheets

(56) References Cited

U.S. PATENT DOCUMENTS

| | | | |
|---|---|---|---|
| 6,738,770 B2 * | 5/2004 | Gorman | 1/1 |
| 6,768,987 B1 * | 7/2004 | Couch et al. | 1/1 |
| 6,847,971 B1 * | 1/2005 | Balaraman et al. | 1/1 |
| 7,113,957 B1 | 9/2006 | Cohen et al. | |
| 7,231,596 B2 * | 6/2007 | Koren | 715/210 |
| 7,908,267 B2 * | 3/2011 | Jenkins et al. | 707/715 |
| 8,145,642 B2 * | 3/2012 | Cruanes et al. | 707/745 |
| 2002/0026438 A1 | 2/2002 | Rjaibi et al. | |
| 2002/0078015 A1 | 6/2002 | Ponnekanti | |
| 2002/0143755 A1 | 10/2002 | Wynblatt et al. | |
| 2002/0194095 A1 * | 12/2002 | Koren | 705/35 |
| 2003/0014394 A1 * | 1/2003 | Fujiwara et al. | 707/3 |
| 2003/0097375 A1 * | 5/2003 | Pennock et al. | 707/104.1 |
| 2004/0010507 A1 * | 1/2004 | Bellew | 707/102 |
| 2004/0220923 A1 | 11/2004 | Nica | |
| 2004/0230584 A1 * | 11/2004 | Nouri | 707/100 |
| 2005/0192961 A1 * | 9/2005 | Dittrich et al. | 707/7 |

* cited by examiner

SYSTEM AND PROGRAM FOR JOINING SOURCE TABLE ROWS WITH TARGET TABLE ROWS

CROSS REFERENCE TO RELATED APPLICATION

This application is a continuation of U.S. patent application Ser. No. 11/095,619 filed Apr. 1, 2005, the disclosure of which is incorporated herein by reference in its entirety.

FIELD OF THE INVENTION

The present invention relates generally relates to database management systems, and more particularly, the present invention relates to a data processing system implemented method, a data processing system and an article of manufacture for joining rows associated with a column of a source table with rows associated with a column of a target table.

BACKGROUND

In order to handle an ever growing amount of information, database management systems have recently been implemented on what are known as distributed or parallel architectures. One form of distributed architecture is the shared-nothing architecture. This architecture is called shared-nothing because the architecture does not include a single point of failure, such as a shared disk or shared memory.

A typical shared nothing system includes a plurality of database partitions coupled together by a network. The database partitions generally include a set of storage devices, such as disk drives, and one or more processors. The network may comprise various types of networks, such as a local area network, and physically diverse paths. Data in a shared nothing system is partitioned using a partitioning scheme such as a hash partitioning scheme and stored across the various database partitions that are connected together through the network. Thus, each database partition keeps a part of the overall database and various operations on parts of the database in different database partitions may be performed in parallel.

Data in the database is kept as tuples in relations that comprises of logically grouped attributes. Tuples and attributes in relations are also referred to as rows and columns in tables. An important feature of any database system, including shared-nothing systems, is the ability to process operations between rows in tables, such as relating data in one table to data in another table. These types of operations are particularly useful when querying related data from multiple tables such that the data needs to be retrieved in a meaningful way. For example, structured query language ("SQL") supports what are known as join operations for querying data from multiple tables. Indeed, many consider the join operation as the cornerstone of database management systems.

A join operation may be expensive to perform in that it may require a large amount of processing and communication resources. One form of join operation in a distributed database system is the semi-join operation. A semi-join operation involves two tables R and S that are stored on different sites within a distributed system. A semi-join from R to S is performed by first projecting R on the join attributes at the site of R. The join attributes typically include one or more keys for selecting various tuples from tables R and S. Site R sends the resulting projection to the site of S, where a join operation is performed. The projection of R essentially acts as a filter of S, and thus, the result of the semi-join is usually smaller than S. Site S then sends to site R the semi-join result to complete the join operation. Hence, semi-joins can require creating and sending projections of one of the tables involved in the join across a network when the tables involved in the join are stored at different sites. This could be expensive and hence techniques to reduce semi-join processing are needed.

Using bit filters is one technique used to reduce the amount of communication during the execution of semi-joins. For example, bit filters can be used to reduce the size of the projection of the joining keys, and thus, reduce the amount of data communication needed. A bit filter operates by hashing the projection data into a set of bits. This set of bits serves as a compressed representation of the hashed data. Bit filters are also known as Bloom filters or Hash filters by those skilled in the art. Prior art that looked at semi-joins in the context of distributed systems essentially dealt with joining tables R and S located at two sites where each site contained a single table.

In general, data in tables in a partitioned environment may be distributed over multiple database partitions. One way to improve the performance of a database system is to divide the join operation or query so that each database partition can work in parallel with little inter-node communication. If data within two tables is partitioned in a similar way, a collocated join would be the most efficient join method. This can be done if the join attributes are the same as the partitioning attributes of the tables. No data would need to be moved to do the join. More often than not, this match of the partitioning keys and the join attributes is not possible and tuples of one or both tables need to be moved across the database partitions in order to perform the join operation. To minimize movement of tuples, bit filters might be used. In known systems, bit filters are broadcast between the various database partitions during various stages of a database operation. However, broadcasting bit filters themselves can consume a large amount of communication resources of the system. For example, when a particular database partition of one table is performing operations for a join, it must broadcast its updated bit filter to all the database partitions of the other table participating in the join. Some systems might use compressed bit filters to improve their efficiency. Unfortunately, even in a compressed form, bit filters can become a tremendous burden particularly when there are a large number of database partitions involved. Each database partition associated with one table requires enough memory space to store all the bit filters of all the other table's database partitions. In addition, database partitions may update their data frequently, and thus, may frequently need to broadcast/re-broadcast their bit filters. This can consume significant communication resources in the database system.

Therefore, it would be desirable to provide methods and systems that efficiently uses processing and communications resources when performing database operations. It would also be desirable, among other things, to provide methods and systems that efficiently use memory and data communications resources to perform various types of join operations across database partitions.

SUMMARY

In an aspect of the present invention, there is provided a data processing system for joining rows associated with a column of a source table with rows associated with a column of a target table, the data processing system including a source node containing the source table and including a target node containing the target table, the data processing system including a generating module for generating a reduced representation of selected rows associated with the column of the source table, and generating a representation of the column of the target table, a filtering module for filtering the generated reduced representation of selected rows associated with the column of the source table through the generated representation of the column of the target table, the filtered generated reduced representation of selected rows identifying source table rows that do not have to be joined with the target table, and a joining module for joining, to the rows associated with the column of the target table, the rows associated with the column of the source table minus the filtered generated reduced representation of selected rows.

In another aspect of the present invention, there is provided an article of manufacture for directing a data processing system to join rows associated with a column of a source table with rows associated with a column of a target table, the data processing system including a source node containing the source table and including a target node containing the target table, the article of manufacture including a program usable medium embodying one or more instructions executable by the data processing system, the one or more instructions including data processing system executable instructions for generating a reduced representation of selected rows associated with the column of the source table, and generating a representation of the column of the target table, data processing system executable instructions for filtering the generated reduced representation of selected rows associated with the column of the source table through the generated representation of the column of the target table, the filtered generated reduced representation of selected rows identifying source table rows that do not have to be joined with the target table, and data processing system executable instructions for joining, to the rows associated with the column of the target table, the rows associated with the column of the source table minus the filtered generated reduced representation of selected rows.

Additional features of the invention will be set forth in part in the description which follows, and in part will be obvious from the description, or may be learned by practice of the invention. The features of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and together with the description, serve to explain the principles of the invention.

DETAILED DESCRIPTION OF THE EMBODIMENTS

Reference will now be made to exemplary embodiments of the invention, which are illustrated in the accompanying drawings. Wherever possible, the same reference numbers will be used throughout the drawings to refer to the same or like parts.

An embodiment provides a method of communicating data between partitions of a database system. Data related to queries of the database system are received at a first database partition designated as the source node. Data that is destined to a second database partition is identified. The second partition is designated as the target node. The target node has a bit filter created based on the tuples of the relation relevant to the query at this partition. The bit filter may be one that is created as part of a join operation such as a hash join or a merge join. These methods are known methods to those skilled in the art. The identified data at the source node is stored in a set of data buffers assigned to the target node. The identified data is encoded into hash codes and stored into a hash code buffer also assigned to the target node. The data buffers and the hash code buffer are filled until a threshold is reached. The threshold is determined based on the number of partitions involved in each relation of the join, the communication layer's buffer window count, memory allocated for the operation and a measure of reduction factor of the bit filter. A separate asynchronous process transmits the hash code buffer to the target node. The target node checks the hash codes against the bit filter and creates a bitmap that indicates tuples in the data buffer at the source node that will not qualify the join operation . . . . The bitmap is transmitted from the target node to the source node where the data from the corresponding data buffers assigned to the target node can be discarded. The data buffers are compacted to eliminate unused space freed up by the discarded tuples if any. The potentially reduced set of data buffers is then sent from the source node to the target node to perform the join operation at the target node.

Figure 1:
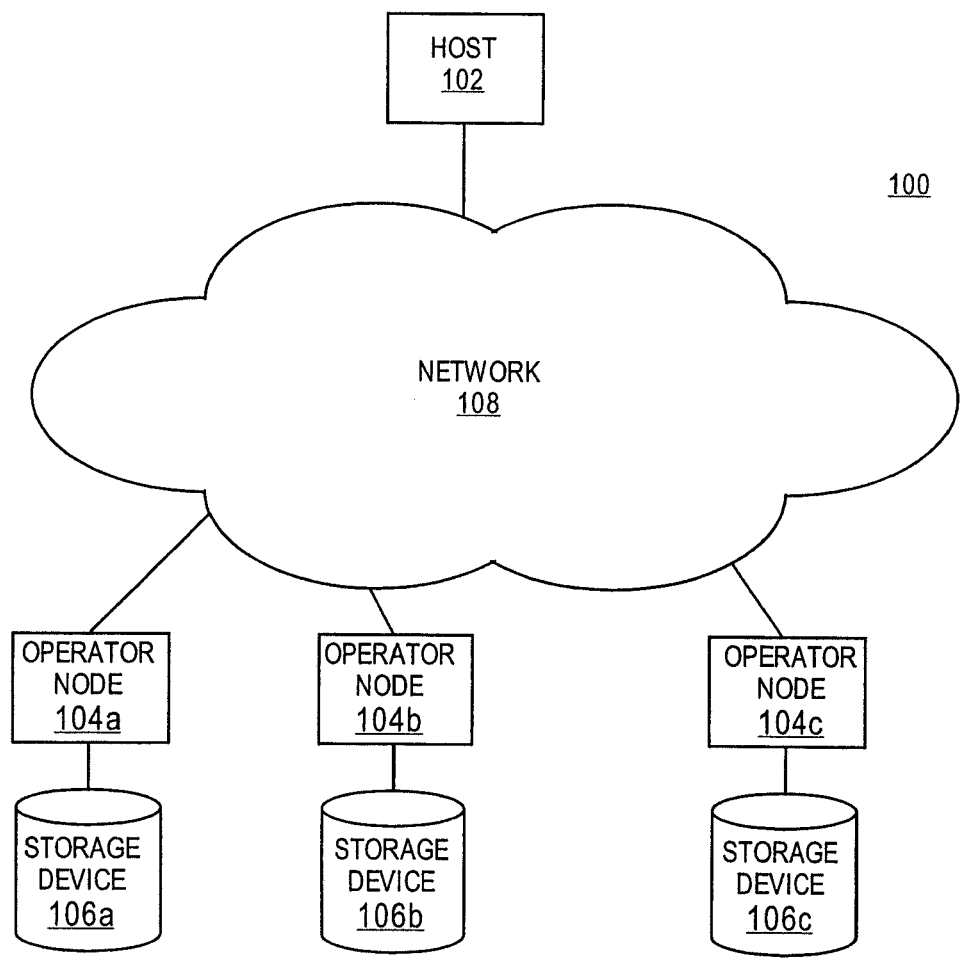
FIG. 1 illustrates a system 100 implemented in the form of a shared nothing distributed architecture.

FIG. 1 illustrates a system 100 implemented in the form of a shared nothing distributed architecture. System 100 can include a host node 102, a set of operator nodes 104a-c, storage devices 106a-c, and a network 108. In general, host node 102 and operator nodes 104a-c may communicate with each other, for example, by passing messages over network 108. In addition, operator nodes 104a-c may be coupled to one or more of storage devices 106a-c. For example, operator nodes 104a-c may be connected to storage devices 106a-c through known types of interfaces, such as small computer system interface ("SCSI"), and integrated drive electronics ("IDE") interfaces. The components of system 100 will now be further described.

Host node 102 coordinates the operation of system 100, such as query parsing, optimization, and compilation. For example, host node 102 may maintain the schema information for databases stored by system 100. In addition, host node 102 may serve as an interface to other devices and systems on behalf of system 100. For example, host 102 may provide an interface for ad-hoc queries, and embedded queries. Host node 102 may be implemented using known general purpose computers and processors.

Operator nodes 104a-c serves as a site for performing various operations of system 100. As shown in FIG. 1, operator nodes 104a-c can be implemented in a parallel, shared-nothing architecture. That is, operator nodes 104a-c are connected to their own disk drives (e.g., storage devices 106a-c) or random access memory and communicate with each other by sending messages through network 108. Accordingly, one skilled in the art will recognize that the embodiment shown in FIG. 1 can scale any number of operator nodes. Operator nodes 104a-c can be implemented using known general purpose computers and processors, such as those manufactured by the Intel Corporation. For example, operator nodes 104a-c can include an Intel Pentium™ processor, and several megabytes of memory.

As noted, operator nodes 104a-c can be configured to communicate with each other based on passing messages over network 108. Small messages, such as those less than 100 bytes can be sent as datagram packets. For larger messages, operator nodes 104a-c may open communications circuit with each other over which messages can be asynchronously transmitted. In some embodiments, after a message has been transmitted, operator nodes 104a-c may release the circuit. In addition, in some embodiments, operator nodes 104a-c may limit the maximum length of a message based on the physical memory available to each processor in operator nodes 104a-c.

Storage devices 106a-c provide local storage for their respective operator nodes, i.e., operator nodes 104a-c. In some embodiments, system 100 may partition tuples of database across storage devices 106a-c. Storage devices 106a-c can be implemented using known devices, such as disk drives or optical disk drives having embedded disk controllers. Storage devices 106a-c may also have its own random access memory to serve as a disk cache.

Network 108 can be any number of interconnections, series of points or nodes, or communication paths for interconnecting the elements of system 100, such as host 102 and operator nodes 104a-c. Network 108 can be configured for communications over various spatial distances and can accommodate various types of data transmission technologies, whether it is public or private. Network 108 can be implemented using hardware and software that are well known to those skilled in the art. For example, network 108 can include a local area network, such as an Ethernet or token ring network. Other types of networks are also consistent with the principles of the present invention.

Figure 2:
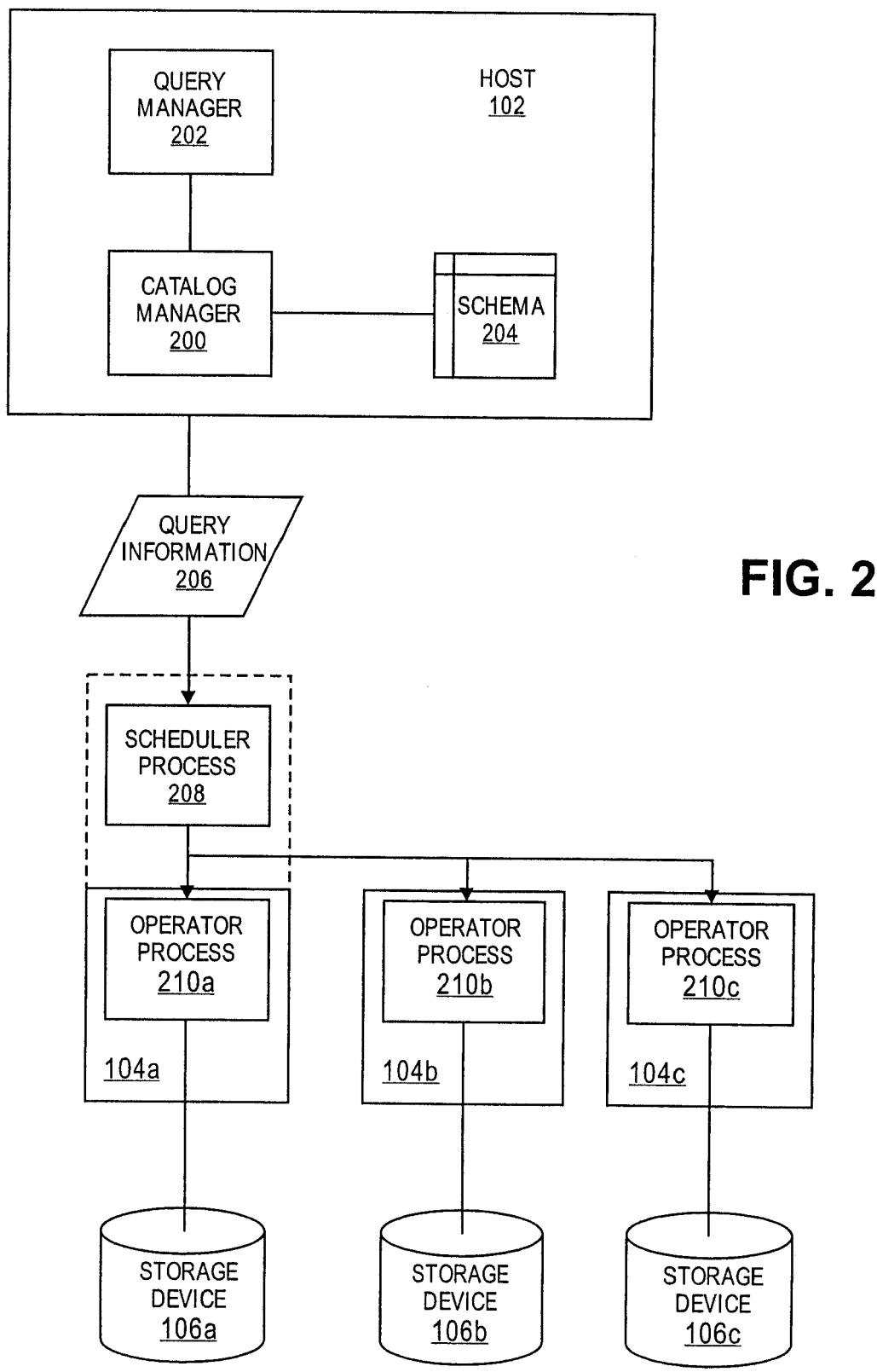
FIG. 2 illustrates a software architecture for the system 100 of FIG. 1.

FIG. 2 illustrates a software architecture for system 100. As shown, host 102 can include a catalog manager 200, a query manager 202, and have access to schema data 204. These components of host 102 will now be described.

Catalog manager 200 can serve as a central repository of all conceptual and internal schema information for each database maintained by system 100, such as schema data 204. Since multiple users may have the same database open at once and a user may reside on a machine (not shown) other than host 102, catalog manager 200 can also ensure consistency among copies of the database cached by each user. In some embodiments, catalog manager 200 can be implemented as a daemon process.

Schema data 204 is a collection of meta-data that describes the relations of the databases maintained by system 100. That is, schema data 204 describes the "layout" of a database that outlines the way data is organized into tables. In some embodiments, schema data 204 is configured using a series of SQL statements, such as "CREATE" statements. Schema data 204 can be loaded into the memory of host 102 when a database is first opened.

Query manager 202 serves as an interface to a database and manages the execution of queries. For example, query manager 202 may cache information from schema data 204 and provide an interface for queries. Query manager 202 can be configured to process ad hoc queries entered by a user (not shown) as well as embedded queries requested by a program executing on another machine.

In addition, query manager 202 can be configured to parse queries, determine a query execution plan, optimize the execution plan, and compile the query execution plan. Query manager 202 can use known relational techniques for query parsing, optimization, and code generation for executing a query. In some embodiments, query manager 202 employs hash-based algorithms for joins and other complex operations.

Query manager 202 may assign scheduler processes, such as scheduler process 208, to a query, and pass the query execution plan in query information message 206 to one or more of operator nodes 104a-c. For example, query manager 202 can recognize that certain queries can be directed to only a subset of the nodes in system 100. In the case of a single site query, query manager 202 may directly send the query in message 206 to the appropriate operator node for execution.

A query may also require the involvement of multiple operator nodes, e.g., operator nodes 104a-c. In order to control the execution of a multi-site query, one of operator nodes 104a-c may be designated a coordinator that is responsible for making global decisions related to the query. A node may be designated as a coordinator based on a variety of factors including, hardware capacity, location, user or administrator configuration, etc. For example, as shown in FIG. 2, operator node 104a has been designated as a coordinator site. However, one skilled in the art will recognize that any of operator nodes 104a-c can function as a coordinator site.

In order to control the execution of a query among multiple nodes, a scheduler process 208 may be activated in a coordinator, e.g., operator node 104a. Scheduler process 208 can run on any of operator nodes 104a-c and multiple instances of scheduler process 208 can run on a single processor or node of system 100. In some embodiments, scheduler process 208 is activated when query manager 202 establishes a connection. Once scheduler process 208 has been activated, query manager 202 sends the compiled query in message 206. In response to receipt of message 206, scheduler process 208 in turn activates operator processes, such as operator processes 210a-c, in operator nodes 104a-c.

One or more of operator nodes 104a-c may then work in conjunction to process the query specified in query information message 206. Operator nodes 104a-c obtain results for the query. For example, operator nodes 104a-c may access their respective storage devices 106a-c to identify tuples or data that satisfy the query. Operator processes 210a-c then collects these results and passes them back to query manager 202 in the form of one or more messages. Query manager 202 reads the results of the query, compiles them, and returns the results through the query interface to the user or program from which the query was initiated.

Figure 3:
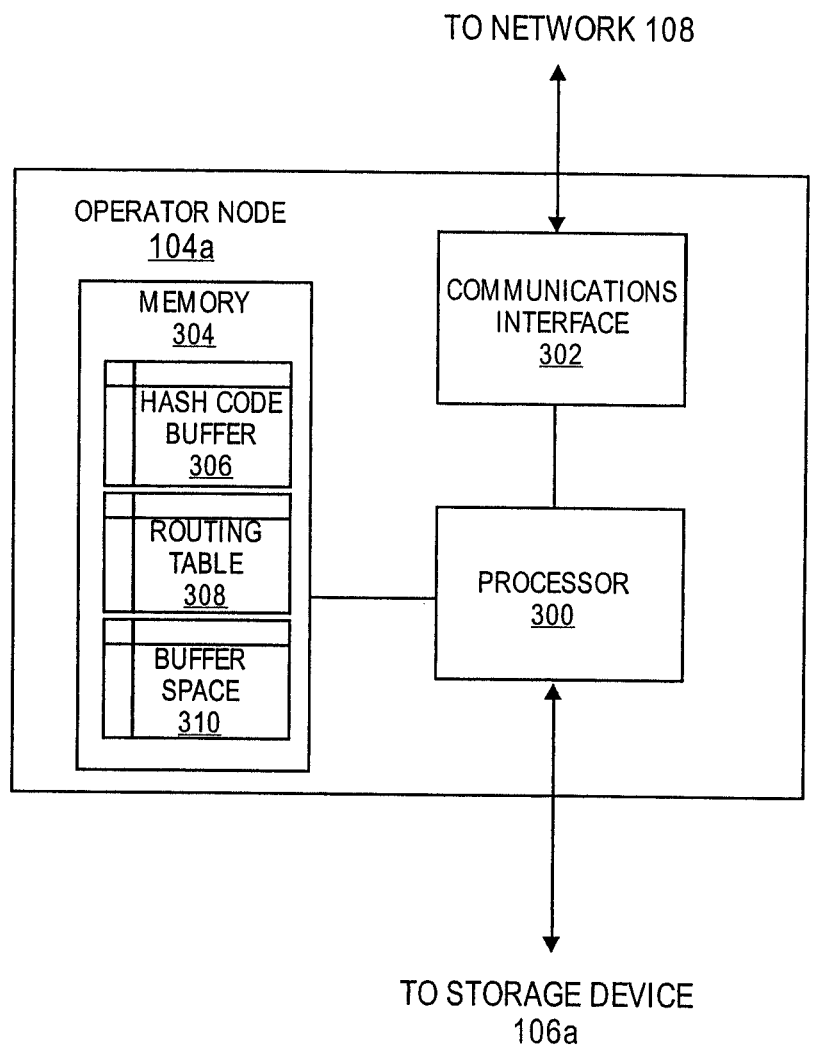
FIG. 3 illustrates an architecture of an operator node which is part of the system 100 of FIG. 1.

FIG. 3 illustrates an architecture of an operator node 104a which is part of the system 100 of FIG. 1. In particular, FIG. 3 illustrates some of the components of operator node 104a. As shown, operator node 104a may comprise a processor 300, a communications interface 302, and a memory 304.

Processor 300 controls the operation of operator node 104a. In particular, processor 300 interprets and executes instructions provided to operator node 104a, such as instructions from operator process 210a. Processor 300 can be implemented as any type of processor, such as a general purpose processors manufactured by the Intel Corporation.

Communications interface 302 couples operator node 104a to network 108. Communications interface 302 can be implemented using known hardware and software. For example, communications interface 302 can be configured as an Ethernet or token ring interface. Other types of communications interfaces are also consistent with the principles of the present invention.

Memory 304 serves as a local main memory for operator node 104a. Memory 304 can be implemented using known types of memory, such as a random access memory. In addition, as shown in FIG. 3, memory 304 may include a hash code buffer 306, a routing table 308, and a buffer space 310. These portions of memory 304 will now be further described.

The hash code buffer space 306 serves as a temporary storage location for hash codes used by operator node 104a. As noted, in some embodiments, operator node 104 may use various hash codes to perform actions related to a query. Such hash codes and their associated algorithms are known to those skilled in the art.

Routing table 308 indicates where operator node 104a should route or send messages for portions of a query. Buffer space 310 serves as a temporary location for the data in these messages. One example of the relationship between routing table 308 and buffer space 310 will now be described with reference to FIG. 4.

Figure 4:
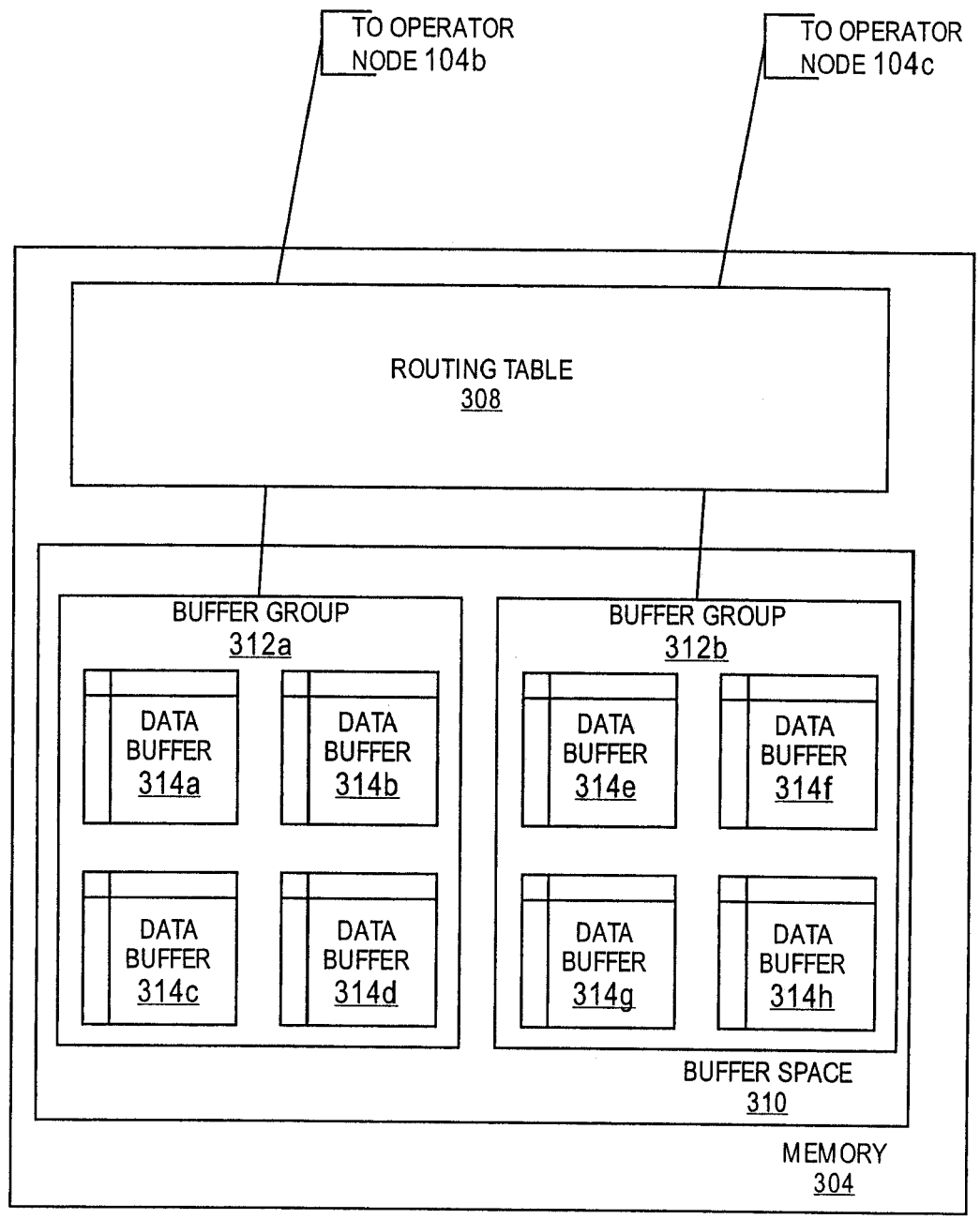
FIG. 4 illustrates an example of a routing table and buffer space in a memory of an operator node, such as the operator node of FIG. 3.

FIG. 4 illustrates an example of a routing table and buffer space in a memory of an operator node, such as the operator node 104a of FIG. 3. As shown, memory 304 may comprise routing table 308 and buffer space 310. In addition, buffer space 310 may be partitioned into buffer groups 312a and 312b. Buffer groups 312a and 312b may further comprise data buffers 314a-d and 314e-h respectively. One skilled in the art will recognize that buffer space 310 can include any number of buffer groups and each buffer group can include any number of data buffers.

During query processing, results for a query may be temporarily stored in data buffers 314a-h. When the results are to be sent to another node, the results are routed based on information in routing table 308. For example, as shown, data buffers 314a-d are routed to operator node 104b and data buffers 314e-h are routed to operator node 104c. Of course one skilled in the art will recognize that memory 304 can be configured in a variety of ways consistent with the principles of the embodiment.

Figure 5A:
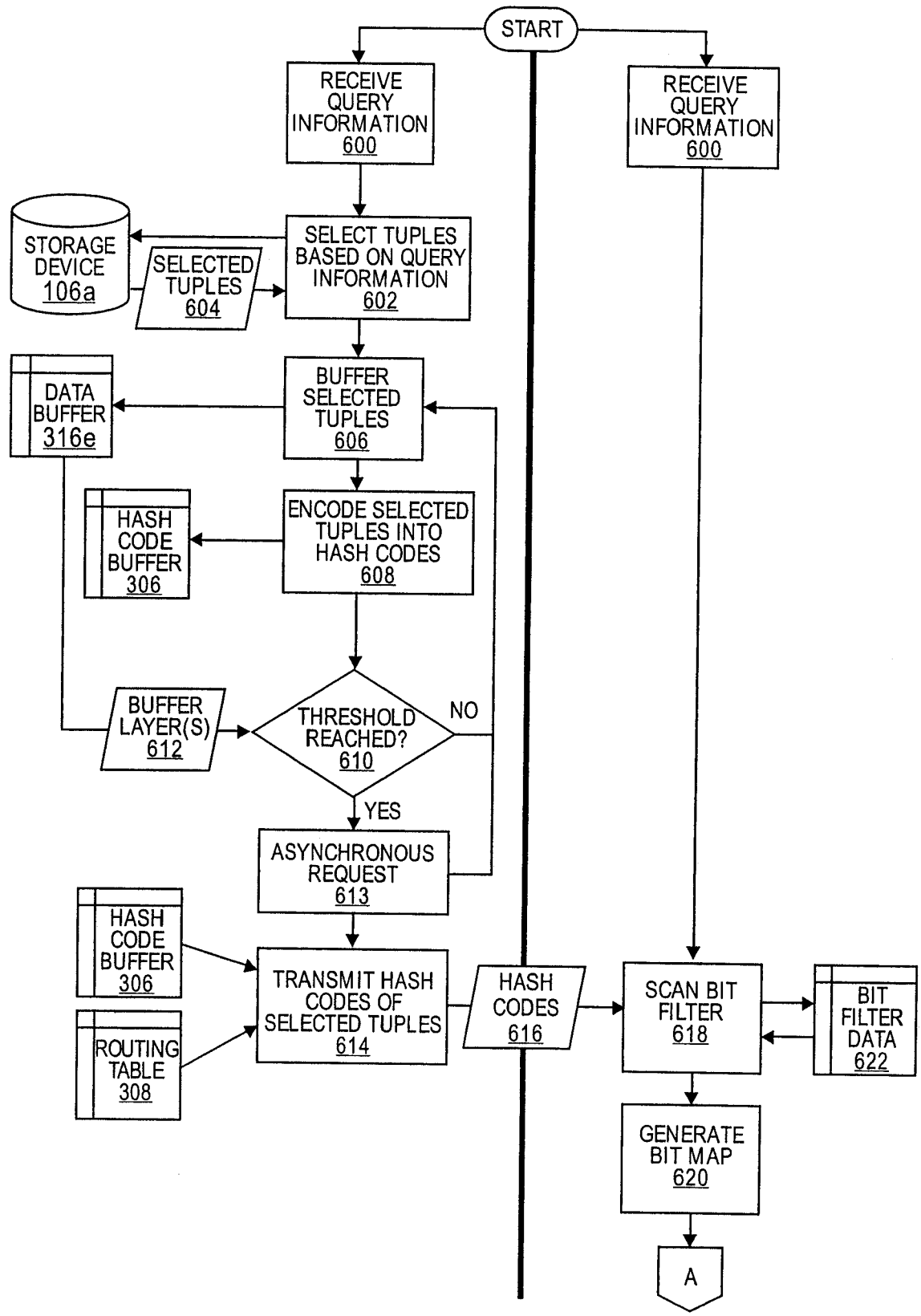
FIGS. 5A and 5B illustrate a process flow related to a join operation of a query involving multiple operator nodes of the system of FIG. 1.
Figure 5B:
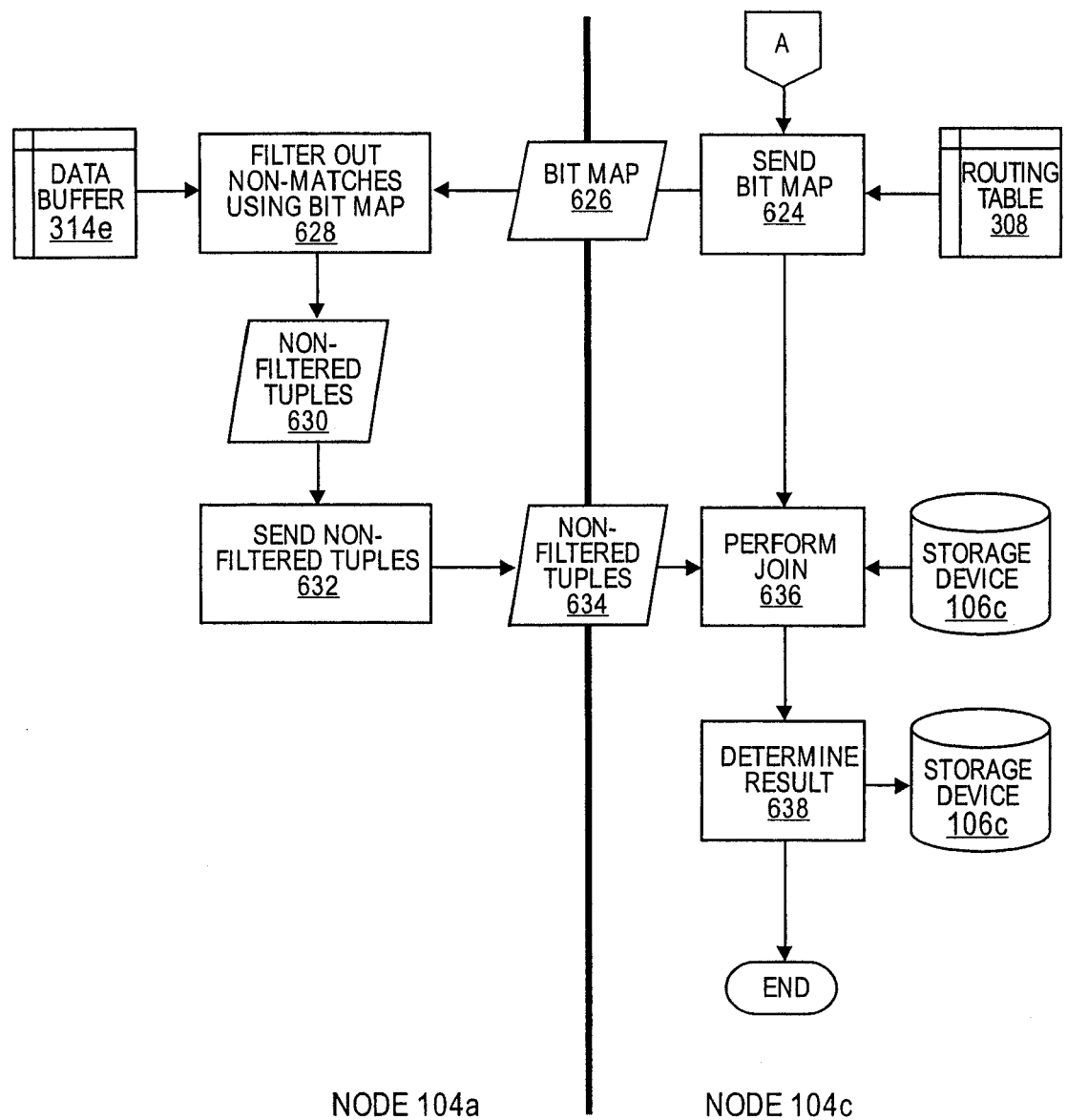

FIGS. 5A and 5B illustrate a process flow related to a join operation of a query involving multiple operator nodes of the system of FIG. 1. In general, when a source node retrieves a tuple for a join operation, it is stored in a data buffer assigned to a target node that is also involved with the join operation. Also, the source node determines one or more hash codes from the tuple and stores these hash codes in a separate buffer, i.e., a hash code buffer. The source operator node then continues processing with other query operations and allows data to accumulate in the data buffers and the hash code buffer corresponding to each target operator node. However, when one or more of the data buffers is full, the first operator node sends the hash code buffer to the target node.

The target operator node creates bit filters from the tuples in the relation prior to or during the initial phase of the join operation. On receiving the hash code buffer from the source operator node, the target operator node creates a bitmap based on the result of checking each hash code against its set of bit filters. The target node then sends the bitmap back to the source node. The source node uses the bitmap to filter out data tuples that will not participate in the join operation. The source node then sends the potentially reduced set of tuples to the target node, where the join operation may be completed. The result of the join operation may then be provided by the target operator node.

In some embodiments, the size of the hash codes and bitmap buffers is smaller than the size of the tuples. For example, in some embodiments, the size of a hash code is 4 bytes, and the size of a bitmap entry per tuple is one bit.

In addition, in some embodiments, communications between operator nodes 104a-c are asynchronous, so that the sending of messages and the processing of tuples can be overlapped. Furthermore, in some embodiments, the data buffers are partitioned into groups of buffers and the hash code buffer are sent after a certain number of data buffers have been filled for a given destination or target operator node.

For purposes of explanation, the following description relates a join operation involving data at operator nodes 104a and 104c. Either operator node 104a or 104c may serve as the coordinator this operation. The various stages for executing the join operation will now be described.

In stage 600, operator nodes 104a and 104c receive information in message 206 related the operations for a query. For example, operator nodes 104a and 104c may receive information in message 206 related to a join operation. This information may be passed to operator nodes 104a and 104b from scheduler process 208, which in turn activates operator processes 210a and 210c. Operator processes 210a and 210c may then activate operator nodes 104a and 104c to perform the operations requested in the information of message 206. Processing may then proceed in parallel in nodes 104a and 104c. The processing in node 104a will now be described.

In stage 602, operator node 104a may perform a projection related to the join operation. In particular, operator node 104a may access storage device 106a and select various tuples from tables in storage device 106 based on predicates of the requested query operation. Storage device 106a may then provide selected tuples 604 to operator node 104a. Processing then flows to stage 606 in operator node 104a.

In stage 606, source operator node 104a buffers tuples 604 into a data buffer designated for target operator node 104c. For example, operator node 104a may store tuples from tuples 604 that are destined for node 104c into data buffer 314e of buffer group 312b. Processing then flows to stage 608 in operator node 104a.

In stage 608, operator node 104a encodes tuples 604 into hash codes. For example, operator node 104a may encode tuples 604 for a join operation based on the well known hybrid hash join algorithm. In particular, the hash codes may be obtained by a hash function that maps the joining key to a hash code. Operator node 104a may then store the hash codes into hash code buffer 306 of memory 304. Processing then flows to stage 610.

In stage 610, operator node 104a determines whether a threshold level has been reached in buffer space 310. In some embodiments, the threshold level is based on buffer level data 612 from the data buffers in buffer space 310. For example, the threshold level may be reached when a single one of data buffers 314a-d or 314e-h is full or substantially full. Alternatively, the threshold level may be based on a predetermined number of data buffers 314a-d or 314e-h are full or substantially full. If the threshold has not been reached, processing in operator node 104a repeats at stage 606. That is, operator node 104 continues to accumulate tuples into its data buffers and build up the hash code buffer corresponding to each target operator node.

However, if the threshold has been reached, then processing flows to stage 613 that asynchronously triggers stage 614 and also goes back to stage 606. In stage 614, operator node 104a transmits the hash codes buffer to the corresponding target operator node 104c. In particular, operator node 104a retrieves the hash codes buffer from hash code buffer space 306 and references routing table 310. Operator node 104a may then send one or more messages, such as hash code message 616, through network 108 to operator node 104c. Asynchronously, source node 104a continues processing at 606 to fill data buffers and hash code buffers for other target nodes. On receiving the hash code buffer, processing at target operator node 104c is active at stage 618.

At stage 618, operator node 104c scans the hash codes based on its bits filters built after receiving relevant data tuples from the second relation received at stage 600 or possibly from the storage device 106c based on the query information. In particular, operator node 104c may scan bit filter data 622 in its local main memory. Bit filter data 622 serves as a summary representation of the tables stored in storage device 106c and may be determined based on well known algorithms. Processing then flows to stage 620.

In stage 620, operator node 104c generates a bit map that indicates the data in bit filter data 622 which matches the hash codes in message 616. Processing then flows to stage 624 in FIG. 5B.

In stage 624, operator node 104c sends the bit map back to the source operator node 104a. In particular, target operator node 104c refers to its routing table 310 and formats a bit map message 626. Operator node 104c then sends bit map message 626 through network 108 back to operator node 104a. Processing then continues at operator node 104a in stage 628.

In stage 628, operator node 104a probes for non-matches to data in bit map message 626. In particular, operator node 104a scans data buffer for example, 314e based on bit map message 626 and filters out non-matching tuples. Processing then flows to stage 632.

In stage 632, operator node 104a sends potentially reduced non-filtered data tuples 630 to operator node 104c to complete the join operation. In particular, source operator node 104a sends the reduced data tuple message 634 to operator node 104c through network 108. Message 634 may comprise one or more of data buffers 314e-h. In addition, in some embodiments, the number of data buffers sent in message 634 is smaller than the threshold level depending on the selectivity of the bit filters and the match with the hash codes. Processing then continues at operator node 104c in stage 636.

In stage 636, operator node 104c performs the join operation based on matching tuple message 634 and tuples retrieved from storage device 106c. Processing then flows to stage 638, where operator node 104c determines a result of the join operation and may then return the matched tuples for further processing in the query or store the result, for example, in storage device 106c. Alternatively, operator node 104c may send the result to host 102. In addition, operator nodes 104a and 104c and host 102 may exchange one or more control messages to indicate to each other that processing for the join operation has been completed. Processing is complete after all the tuples relevant to the query at the source nodes and the tuples at all the target nodes have been matched.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A data processing system for joining rows associated with a column of a source table with rows associated with a column of a target table, the data processing system including a source node containing the source table and including a target node containing the target table, the data processing system comprising:
    a processor;
    a generating module, executed on the processor; for generating a reduced representation of selected rows associated with the column of the source table, and generating a representation of the column of the target table;
    a filtering module for filtering the generated reduced representation of selected rows associated with the column of the source table through the generated representation of the column of the target table, the filtered generated reduced representation of selected rows identifying source table rows of the reduced representation of selected rows associated with the column of the source table that do not have to be joined with the target table;
    a joining module for joining, to the rows associated with the column of the target table, the rows associated with the column of the source table minus the filtered generated reduced representation of selected rows;
    a placing module for placing, into a data buffer, selected rows identifying the source table rows at the source node;
    a using module for using separate data buffers on each source node, the selected rows identifying the source table rows at a corresponding source node; and
    a usage module for using separate data buffers at each node for each set of rows of the source table to be sent to a different target node.

2. The data processing system of claim 1, wherein the generated representation of the column of the target table is a bit filter.

3. The data processing system of claim 1, further comprising:
    asynchronously sending the generated reduced representation of selected rows to the target node.

4. The data processing system of claim 1, wherein the generating module for generating of the reduced representation of selected rows comprises an applying module for applying a hashing function against the column associated with selected rows identifying the source table rows.

5. The data processing system of claim 1, wherein the generating module for generating of the reduced representation of selected rows further comprises a constructing module for constructing a hash code buffer, the constructed hash code buffer representing the source table rows to be sent to the target node.

6. The data processing system of claim 1, wherein the filtered generated reduced representation of selected rows is a bit map generated by matching hash code buffer values with a bit filter associated with the target table, the bit map identifying the source table rows that are not to be joined with the target table rows.

7. The data processing system of claim 1, further comprising:
    a using module for using separate reduced representations of the selected source table rows at each source node; and
    a usage module for using separate reduced representations of selected source table rows to be sent to each target node.

8. The data processing system of claim 1, further comprising:
    a distributing module for distributing the target table to a set of target nodes prior to joining the rows associated with the column of the source table with the rows associated with the column of the target table.

9. The data processing system of claim 1, wherein the joining of the rows associated with the column of the source table with the rows associated with the column of the target table is a non-collocated join.

10. The data processing system of claim 6, further comprising:
    a generation module for generating a potentially reduced set of data buffers after filtering the source table rows stored in source data buffers based on the bit map.

11. The data processing system of claim 1, further comprising, if the source table and the target table are collocated:
an avoiding module for avoiding transmission of hash codes contained in a hash code buffer; and
an avoidance module for avoiding waiting for a bit map to decide if any rows may be discarded, the discarded rows not to be joined between the source table and the target table.

12. The data processing system of claim 1, wherein the generating module generates, based on predicates of a join request, a first representation of rows associated with the column of the source table, and thereafter, the generating module generates the reduced representation of the selected rows associated with the column of the source table based on the generated first representation, wherein the size of the reduced representation is smaller than the first representation.

13. An article of manufacture for directing a data processing system to join rows associated with a column of a source table with rows associated with a column of a target table, the data processing system including a source node containing the source table and including a target node containing the target table, the article of manufacture comprising:
a non-transitory program usable medium embodying one or more instructions executable by the data processing system, the one or more instructions comprising:
data processing system executable instructions for generating a reduced representation of selected rows associated with the column of the source table, and generating a representation of the column of the target table;
data processing system executable instructions for filtering the generated reduced representation of selected rows associated with the column of the source table through the generated representation of the column of the target table, the filtered generated reduced representation of selected rows identifying source table rows of the reduced representation of selected rows associated with the column of the source table that do not have to be joined with the target table;
data processing system executable instructions for joining, to the rows associated with the column of the target table, the rows associated with the column of the source table minus the filtered generated reduced representation of selected rows;
data processing system executable instructions for placing, into a data buffer, selected rows identifying the source table rows at the source node;
data processing system executable instructions for using separate data buffers on each source node, the selected rows identifying the source table rows at a corresponding source node; and
data processing system executable instructions for using separate data buffers at each node for each set of rows of the source table to be sent to a different target node.

14. The article of manufacture of claim 13, wherein the generated representation of the column of the target table is a bit filter.

15. The article of manufacture of claim 13, further comprising:
data processing system executable instructions for asynchronously sending the generated reduced representation of selected rows to the target node.

16. The article of manufacture of claim 13, wherein the data processing system executable instructions for generating of the reduced representation of selected rows comprises data processing system executable instructions for applying a hashing function against the column associated with selected rows identifying the source table rows.

17. The article of manufacture method of claim 13, wherein the data processing system executable instructions for generating of the reduced representation of selected rows further comprises
data processing system executable instructions for constructing a hash code buffer, the constructed hash code buffer representing the source table rows to be sent to the target node.

18. The article of manufacture of claim 13, wherein the filtered generated reduced representation of selected rows is a bit map generated by matching hash code buffer values with a bit filter associated with the target table, the bit map identifying the source table rows that are not to be joined with the target table rows.

19. The article of manufacture of claim 13, further comprising:
data processing system executable instructions for using separate reduced representations of the selected source table rows at each source node; and
data processing system executable instructions for using separate reduced representations of selected source table rows to be sent to each target node.

20. The article of manufacture of claim 13, further comprising:
data processing system executable instructions for distributing the target table to a set of target nodes prior to joining the rows associated with the column of the source table with the rows associated with the column of the target table.

21. The article of manufacture of claim 13, wherein the joining of the rows associated with the column of the source table with the rows associated with the column of the target table is a non-collocated join.

22. The article of manufacture of, claim 18, further comprising:
data processing system executable instructions for generating a potentially reduced set of data buffers after filtering the source table rows stored in source data buffers based on the bit map.

23. The article of manufacture of claim 13, further comprising, if the source table and the target table are collocated:
data processing system executable instructions for avoiding transmission of hash codes contained in a hash code buffer; and
data processing system executable instructions for avoiding waiting for a bit map to decide if any rows may be discarded, the discarded rows not to be joined between the source table and the target table.

24. The article of manufacture of claim 13, further comprising:
data processing system executable instructions for generating, based on predicates of a join request, a first representation of rows associated with the column of the source table,
wherein the data processing system executable instructions for generating the reduced representation comprise generating the reduced representation of the selected rows associated with the column of the source table based on the generated first representation, wherein the size of the reduced representation is smaller than the first representation.

* * * * *